July 10, 1928.  
C. N. BERGMANN ET AL  
1,676,378  
COVER PLACING MECHANISM FOR UNIT MEASURING MACHINES  
Filed July 2, 1925   5 Sheets-Sheet 1

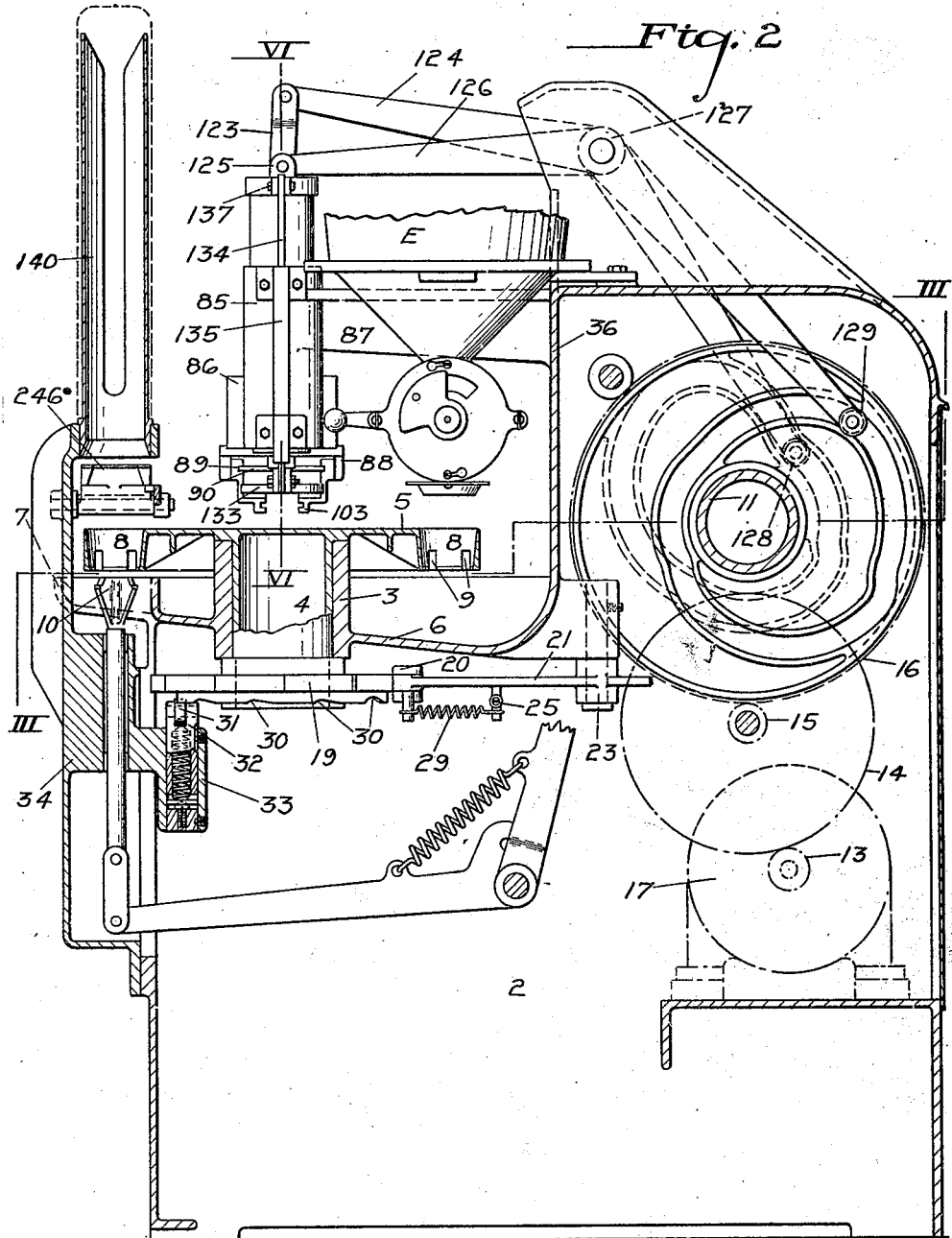

July 10, 1928.
C. N. BERGMANN ET AL
1,676,378
COVER PLACING MECHANISM FOR UNIT MEASURING MACHINES
Filed July 2, 1925 5 Sheets-Sheet 3
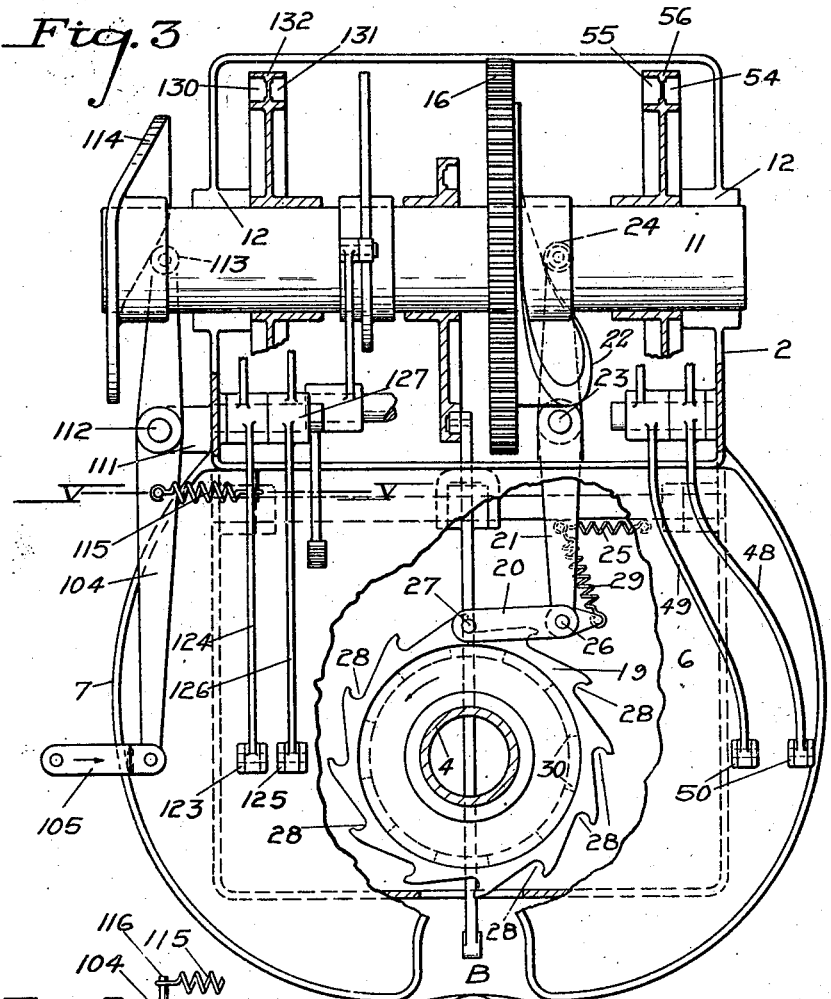
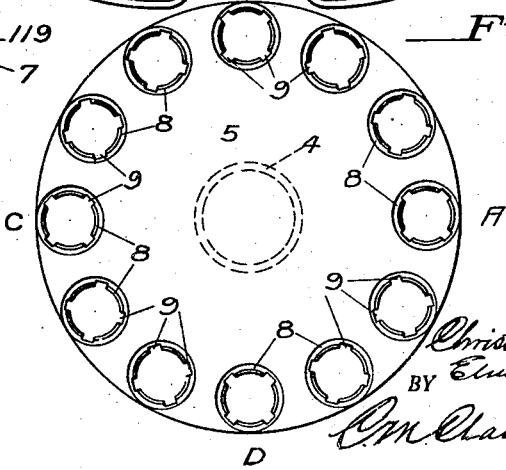
INVENTORS.
Christian N. Bergmann
Elmer F. Taylor
BY Cyrus Taylor
C. M. Clarke ATTORNEY.

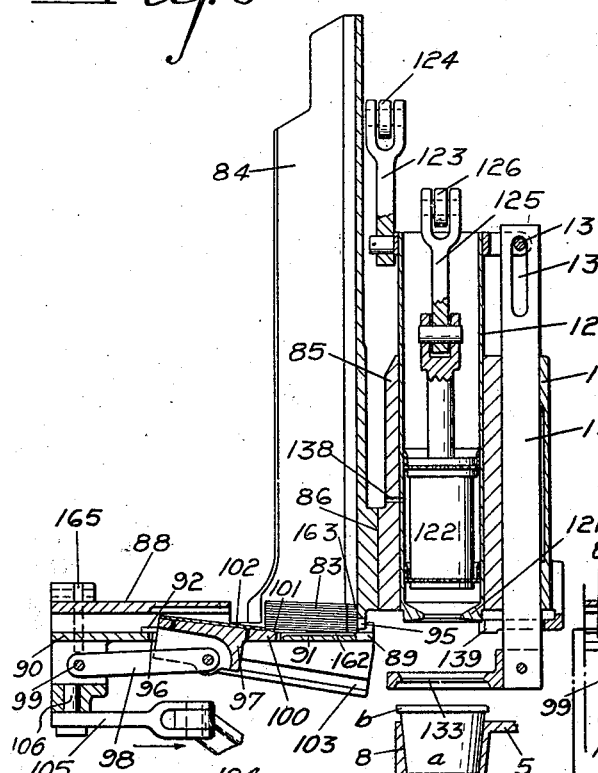

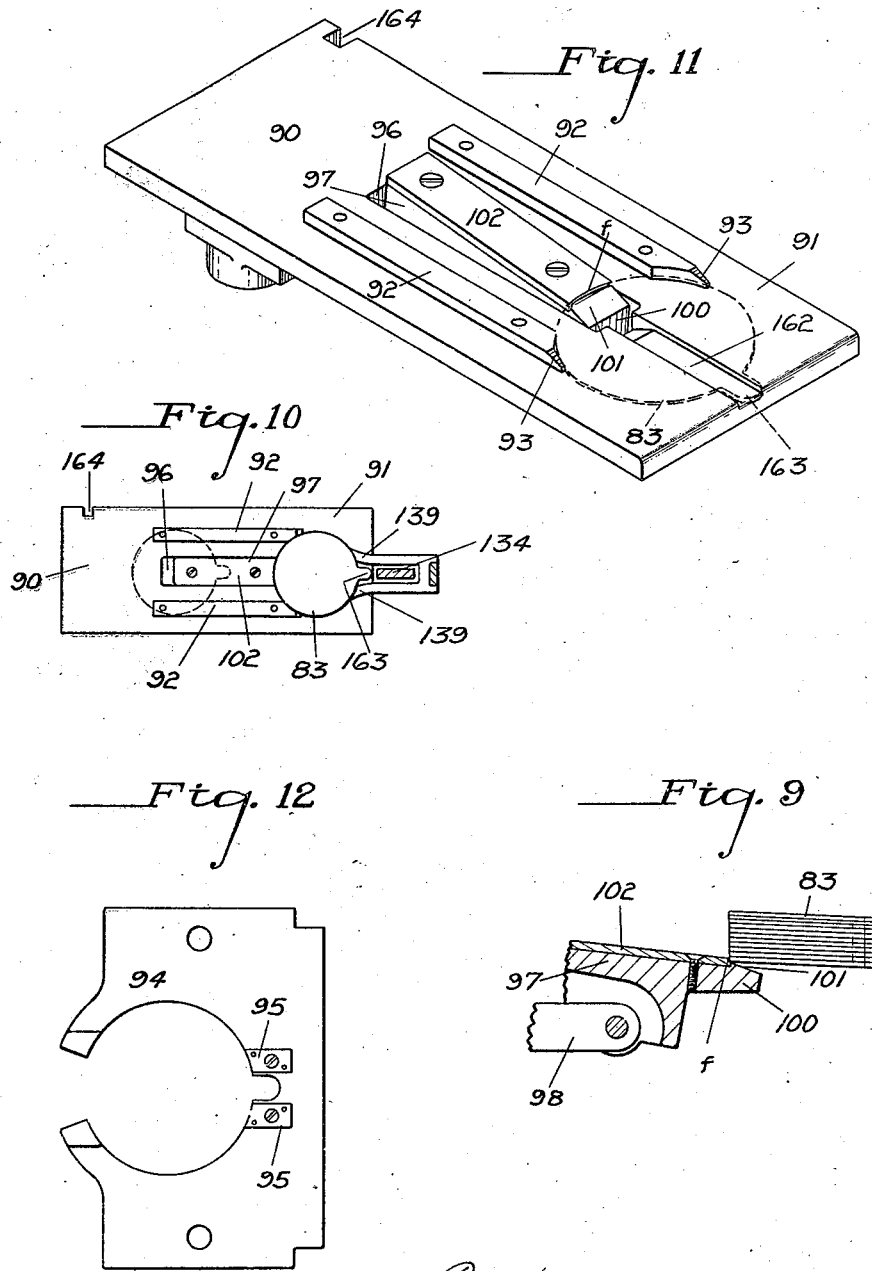

Patented July 10, 1928.

1,676,378

UNITED STATES PATENT OFFICE.

CHRISTIAN N. BERGMANN, OF PITTSBURGH, PENNSYLVANIA; ELMER Z. TAYLOR, OF NEWARK, NEW JERSEY; AND CYRUS TAYLOR, OF HARTFORD, CONNECTICUT, ASSIGNORS TO BERGMANN PACKAGING MACHINE COMPANY, OF PITTSBURGH, PENNSYLVANIA, A CORPORATION OF DELAWARE.

COVER-PLACING MECHANISM FOR UNIT-MEASURING MACHINES.

Application filed July 2, 1925. Serial No. 41,106.

Our invention relates to improvements in machines for measuring and covering units of mobile material, as ice cream, for separating such measured units from a mass, depositing them separately into containers or receptacles, and ejecting the filled receptacles.

The machine is generally similar in its main elements to that shown in a prior application filed by C. N. Bergmann et al on April 4, 1925, Serial No. 20,696, but differs therefrom mainly in the use of an intermittently rotatable carrying turret for the receptacles, instead of a longitudinally movable carrying trays, in an improved cover placing mechanism, and in other respects hereinafter described.

The present invention is also generally similar to that shown and described in a co-pending companion application, Serial No. 40,796, and relates particularly to mechanism for placing the caps or covers on the receptacles to close them after filling.

The machine as a whole comprises a rotatable turret wheel having an annular series of cup receiving cavities, means by which each cavity is brought successively in registering position underneath the cup depositor, the filling mechanism, the capper, and then over the ejector, respectively.

The cover placing mechanism herein involved embodies a suction controlled plunger and its operating mechanism, in connection with means for selecting a cap or cover from the bottom of a magazine or bank thereof and placing it into operative position with relation to the plunger, such mechanism acting in sequential relation to the various other operative mechanisms, with suitable rest periods.

In the drawings illustrating one preferred embodiment of the invention:

Figure 2 is a partial vertical sectional view thereof on the line II—II of Fig. 1.

Figure 3 is a horizontal sectional view on line III—III of Fig. 2 partly broken away.

Figure 4 is a plan view of the turret.

Figure 5 is a detail sectional view on the line V—V of Fig. 3.

Figure 6 is an enlarged vertical sectional view on the line VI—VI of Fig. 2 showing the capping mechanism in its initial position.

Figure 7 is a similar view showing the cap placed underneath the suction plunger.

Figure 8 is a similar view showing the cap shifter retracted in the plunger in lowered position.

Figure 9 is an enlarged sectional detail view of the cap selector.

Figure 10 is a plan view of the cap supporting and shifting plate, on the line X—X of Fig. 7.

Figure 11 is a perspective detail view showing the combined shifting plate and cap selector mechanism.

Figure 12 is an under plan view of the bottom of the cap magazine.

Figure 1:
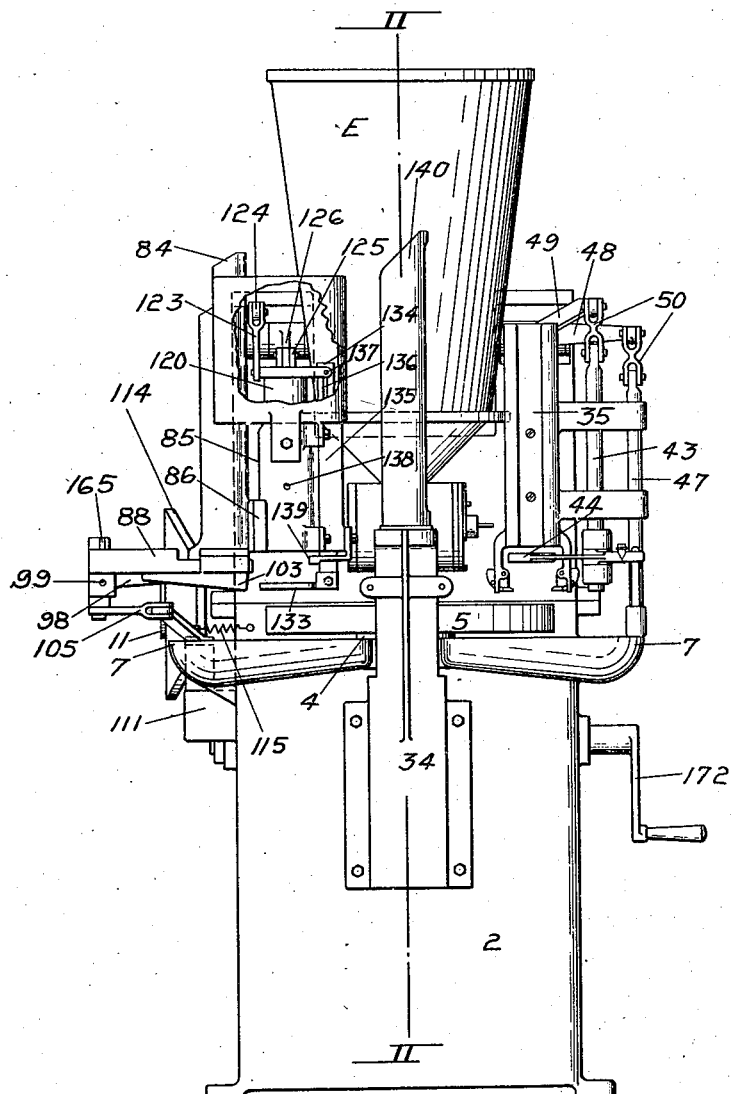
Figure 1 is a view of the machine in front elevation.

Referring to the drawings, the operative portions of the machine are mounted upon and within a hollow box-shaped base 2 of cast metal supported upon the floor or foundation by a suitable flat pedestal, as in Fig. 1. At the front middle portion of the base is a vertically arranged bearing 3 in which is rotatably mounted the central depending stem 4 of the turret 5. Bearing 3 is cast integral with a laterally extending transverse bottom wall 6, forming a concave dish or basin, surrounding the turret beyond the lower base and providing a rearwardly inclined collecting and drainage cavity for excess cream, washing, etc.

As shown in Fig. 3 the outer edges 7 are rounded, and surround the turret, a drain connection being made at the lower level for cleaning purposes. Turret 5 is generally of the form of a flat wheel or disk, having an annular series of tapered sockets 8 open at the bottom and provided with lateral clearance openings 9 for the discharging plunger 10. Sockets 8 are of a size to receive and support on their flanged bottoms the cups or receptacles $a$ as they are deposited therein for filling.

It will be understood that sockets 8 are in multiples of four, as twelve, so as to always locate a socket at four equidistant points around the center, in position for cup depositing, filling, capping, and discharge, at each intermittent rest period of the turret.

The several mechanisms for such purpose receive their operative movement from a main transverse shaft 11 mounted in bearings 12—12 of the main frame 2. Shaft 11 is driven through gearing 13—14—15—16 or other suitable gearing, from a motor 17.

The machine may also be manually operated by crank 172 having suitable clutch connection with the motor shaft.

Turret 5 is intermittently rotated, say one twelfth of a revolution with an intervening rest period, by a ratchet wheel 19 and pawl 20 of lever arm 21 by cam 22 extending from and movable with gear 16. Lever 21 is pivoted at 23 and its terminal roller 24 is held against the annular face of cam 22 by a spring 25. Pawl 20 is pivoted at 26 to the other end of lever 21 and its free end has a terminal pin or roller 27 adapted to engage the successive teeth sockets 28 of the ratchet wheel 19 for each operation, under control of spring 29 secured to the other end of the pawl and to the lever, as shown.

The under side of ratchet wheel 19 is provided with a series of holding sockets 30 adapted to co-act with roller 31 of a spring retracted stud 32 mounted in a supporting housing 33 of the discharge plunger housing 34. In its intermittent rotation, one complete revolution of the turret will bring each of the annular cavities 8 into rest positions A, B, C and D respectively. In such positions, a cup is placed in the cavity at A, the cup is filled at B, the cover or cap is placed in the cup at C, and the filled cup is discharged upwardly at D.

The cups $a$ provided with a rim $b$ are nested in a vertical column above position A of the turret in a magazine tube 35 rigidly supported from the main frame of the machine. Each cup is tapered to fit snugly in the cavity 8 of the turret without binding and the lowermost cup of the magazine series is lowered into the particular registering cavity of the turret by the mechanism disclosed in said companion application, Serial No. 41,105, and also in another copending application Serial No. 40,796.

Such mechanism is actuated from main shaft 11 through cam 56, the grooves 54—55 of which engage the terminal rollers 52—53 of lever arms 48—49. Said arms are connected by links 50—50 with the independently movable stems 43—47 by which the grasping clamps or jaws 44 are caused to extract and deposit the lowermost cup in the turret cavity.

After such depositing, turret 5 is moved around one space and the operation is repeated until the cups successively reach position B where each cup is filled with ice cream or other suitable commodity by the unit delivering mechanism from the hopper E. Said unit forming and delivering mechanism is preferably of the construction shown in said first mentioned application but may be of any suitable type, and the present invention is not necessarily limited to use with any particular cup placing or cup filling means. In the intermittent progress of the turret the filled cups are brought successively into registering relation with the capper at position C.

The filled cups are there capped and covered by placing within the upper edge of each cup a thin paper disk 83 having a projecting withdrawal tang 163.

Said disks are mounted in vertically arranged bank in a magazine tube 84, slotted along its outer side, and fixedly bolted to the plunger frame 85 at 86. The plunger frame 85 is rigidly supported in front of the gear housing frame 36 of the machine by a bracket 87. Secured underneath the bottom of magazine tube 84 is a horizontal track plate 88 having a flanged trackway 89 in which is slidably mounted the cover slide or shifting plate 90.

Said slide is in the form of a flat plate adapted to move immediately underneath the bank of caps 83 and to support the lowermost of the series of caps upon its front shelf extension 91. At each side of its longitudinal center are strips 92—92 which extend above the level of the surface of the plate sufficiently far to support the disks above the plate with sufficient clearness of the push finger or trigger on backward movement.

The bottom of the cap magazine is flat as at 94, Fig. 12, having a middle clearance opening and a tang opening for clearance of the caps, and limiting blocks or abutments 95. These extend downwardly close to the surface of shelf 91 of plate 90, with just sufficient clearness for passage of the lowermost cap as it is pushed inwardly. Plate 90 has a central longitudinal slotted opening 96 for clearance of the preliminary push finger 97 which moves in and out with the shifter plate 90. Block 97 is pivotally connected by link 98 with the rear thickened end of plate 90 at 99, and is designed to ride downwardly at a slight incline from its initial outer position, so as to become detached from engagement with the lowermost cap after it has been started and is engaged by the ends 93 of strips 92. The advancing end of block 97 is provided with a horn 100, the upper face 101 of which is tapered as shown, so as to provide clearance in case any cap being acted upon at the bottom of the bank should be warped downwardly. By this means the caps are also slightly tilted up at the rear.

The block 97 has a thin steel plate 102 on its top which extends above the highest rear portion of incline 101 and is just thick enough to preliminarily engage the bottom cap by the concaved undercut end $f$ of plate 102. Block 97 is mounted by side flanges in a downwardly inclined track 103 depending at each side of track plate 88, so that as the block moves inwardly it will quickly separate the lower cap by the front edge of plate 102 acting as a trigger, and will carry it inwardly.

As the push finger and trigger advances and lowers, it carries the lowermost cap inwardly underneath the limiting abutments 95, and at the same time just in front of the concaved terminals of strips 92.

As the push finger advances and at the same time lowers down inclined trackway 103, the terminal *f* of plate 102 disengages from the edge of the cap, and the cap is then in abutting engagement with the concaved ends of strips 92. These strips, by their concaved ends, act to accurately centralize the cap so as to positively locate it in proper central position under the plunger. At the end of the movement of plate 90 the cap engages against the sides of stop 139 with the tang between them, as in Fig. 10.

Plate 90 is provided at its forward end with a groove 162 for clearance of the cover tang 163 to prevent upward springing of the cap, should the tang be bent down. A notch or socket 164 at one side of the plate provides for locking the plate in retracted position by an adjustable dog 165, should it be desired to put the capper out of service temporarily.

Owing to the restricted clearance space, the cap is forced to lie flat against the surface of the shelf extension 91 and will be carried inwardly to the end of its movement under the suction plunger.

On backward movement of block 97, due to riding upwardly along inclined tracks 103, plate 102 will bear against the rear edge of the next lowermost cap and will tilt it and the corresponding edges of the bank of caps upwardly, as in Fig. 9. Plate 90 and block 97 are moved inwardly and outwardly by lever 104 connected by link 105 underneath to the rear end of plate 90 by pivoting stud 106.

Lever 104 is pivoted on supporting bracket 111 of the frame at 112 and extends backwardly, bearing by terminal roller 113 against the inner face of cam 114 on the end of shaft 11. A spring 115 connected to the frame and to lever 104 at 116 holds the roller 113 against the cam and constantly tends to throw the other end of the lever and link 105 and the sliding plate 90 inwardly. The cam 114 is so proportioned that when its outer portion comes opposite the roller, the plate will be thrust inwardly, pushing the lowermost cap underneath the plunger as in Fig. 7, after which the plate is receded to its initial position by the cam.

The outer flat portion of the cam 114 allows the shifting plate 90 to remain inwardly sufficiently long to support the cap upon its terminal shelf 91 until it becomes firmly grasped against the lower end of the suction actuated plunger. Lever 104 is provided with an adjusting temper screw 117 mounted in lug 118 and adapted to engage a bearing lug 119 of the rounded edge of the side frame. By such means the inward movement of the lever and cover plate 90 may be accurately regulated.

The suction plunger consists of an outer tubular casing 120 having a centrally open slightly concaved head 121, with an inner relatively movable suction plunger 122. Casing 120 is slidably mounted in plunger frame 85 and is vertically reciprocated by a link 123 connected to lever 124. In the same way plunger 122 is connected by link 125 with lever 126, both of said levers being pivotally mounted on a fulcrum bearing 127 across the top of the gear housing frame, as in Fig. 2.

Each lever extends rearwardly and is provided with a terminal roller 128—129, engaging the cam grooves 130—131, respectively of cam 132 on shaft 11.

A centering retaining ring 133 is secured in registering alinement with the plunger and cup cavity through which the cap is lowered into the rim of each cup. Said ring is adapted to be lowered by gravity upon and around the cup rim, as in Fig. 8, as the plunger lowers, and to retain the cup in place with its inserted cap, upon upward movement of the plunger. The ring as shown is tapered inwardly at the top and bottom, providing for centralizing and accurate placement of the cap and for holding engagement against the rim of the cup.

Ring 133 is secured to the lower end of a bar 134 which is slidably guided in a lateral housing 135 of plunger casing 85, and is connected by slot 136 and pin 137 with the upper end of plunger casing 120.

At the proper level, casing 120 is provided with a relief port 138 to break the vacuum in the plunger casing when plunger 122 rises above said port, as in Fig. 8.

In operation, when the cap is pushed inwardly to registering position with the plunger, head 121 is first lowered upon it, pressing it against the plate shelf. Plunger 122 then commences to travel upwardly to create a suction sufficient to hold the cap 83 against the under side of head 121, and said head is then raised just sufficient, say one quarter inch, to lift the cap clear of the plate, plunger 122 continuing to rise, at a slower speed. The plate is then withdrawn, leaving the cap suspended up against head 121.

Head 121 is then lowered with the cap while plunger 122 rises to increase the suction, and head 121 by its reduced terminal presses the cap through the ring 133 and inserts the cap firmly in position within the rim *b* of the cup. Plunger 122 continues to rise until it is above port 138, at which time head 121 has placed the cap in the cup. The vacuum is then broken, releasing the suction on the cap and to prevent the cap and cup from being raised out of the socket 8 of turret 5. The plunger casing and its head, and the plunger then resume their original position ready for another operation.

The weight of ring 133 and its supporting bar 134 continue to rest on the cup rim until the plunger mechanism has been withdrawn upwardly, preventing any possibility of sticking, and acting to ensure stripping of the cup in such case.

After the cover is thus placed in the filled receptacle, it is carried around by the turret to the final ejecting position D, where each cup is pushed upwardly by plunger 10 through temporarily supporting mechanism 246 into the receiving slotted tube 140.

The several filled cups are removed from said receiving tube from time to time as they accumulate within enclosing bags, as described in said companion application.

From the foregoing description it will be understood that each of the sockets 8 of turret 5 is occupied successively by an empty cup at position A, and that as each arrives at the subsequent positions B, C, and D, the successive operations of filling, capping, and discharging are performed.

The capping or closing mechanism for the cups forming the subject matter of the present application is accurate and reliable in that it insures selection of the lowermost cover accurately underneath the suction-actuated plunger. Said plunger, by its construction and operation, together with the guiding ring, positively and accurately effects placing of the cover within the cup and insures against any jamming or interference due to partial displacement or lifting of the cup and its contents.

The operation of the machine as a whole is continuous, rapid, and substantially automatic, merely requiring renewal of the cup and cap supply in their respective magazine tubes, with attention to the other incidental requirements of the machine.

The several movements are all effected through the various cams and their transmitting levers or equivalent thereof, in the manner described and illustrated. The machine as a whole is very compact and of comparatively small size, considering its capacity and speed of operation.

It may be changed or varied by the skilled mechanic in various details or features, or otherwise modified within the range of the general principle of operation, but all such changes are to be considered as within the scope of the following claims:

We claim:

1. The combination with an intermittently movable package carrier, of a superimposed open bottom cover holder, a laterally arranged suction plunger, means operatively connected with the carrier for actuating the suction plunger, and a slide plate having edge engaging abutments and a vertically movable cover engaging device adapted to select and move a lowermost cover from the holder and to place it in registering relation with the plunger.

2. The combination with an intermittently movable package carrier, of a superimposed open bottom cover holder, a laterally arranged suction plunger, means operatively connected with the carrier for actuating the suction plunger, a limiting abutment for the cover, and a slide plate having edge engaging abutments and a vertically movable cover engaging device adapted to select and move a lowermost cover from the holder and to place it against said abutment in registering relation with the plunger.

3. Cover placing mechanisms consisting of a plunger having an inner suction creating head, means for independently actuating the plunger and its head, and a side plate adapted to shift a cover into registering relation with the plunger.

4. Cover placing mechanism consisting of a plunger having an inner suction creating head, means for independently actuating the plunger and its head, and a slide plate having supporting strips for terminal edge engagement with a cover adapted to shift it into registering relation with the plunger.

5. Cover placing mechanism consisting of a plunger having an inner suction creating head, a slide plate having pushing abutments for terminal edge engagement with a cover, and a relatively movable selecting device adapted to initially shift a cover for movement by the abutments into registering relation with the plunger.

6. A device for cover placement consisting of a hollow plunger provided with an inner suction head, and means for imparting independent movement to the plunger and head.

7. A device for cover placement consisting of a hollow plunger provided with a leakage port, an inner suction head adapted to uncover said port, and means for imparting independent movement to the plunger and head.

8. In combination with a hollow two-part suction plunger having an inner head and an outer telescoping casing, and means providing for independent movement of each, a guide ring depending below the plunger having slotted connection with the casing.

9. In combination with a hollow two-part suction plunger having an inner head and an outer telescoping casing, and means providing for independent movement of each, a guide ring depending below the plunger having slotted connection with the casing, and means for placing a cover in registering relation with the plunger.

10. In combination with a hollow two-part suction plunger having an inner head and an outer telescoping casing, and means providing for independent movement of each, a guide ring depending below the plunger having slotted connections with the casing, an arresting abutment, and a slide plate adapted to locate a cover in registering relation with the plunger against said abutment.

11. In combination with a guiding frame, a hollow suction plunger mounted therein having an apertured bottom, a reciprocable suction head in the plunger, a guide ring below the plunger, a supporting bar therefor having slotted connection with the plunger, and means for actuating the plunger and the suction head independently.

12. In combination with a cover magazine tube having limiting abutments on its lower face, a slide plate having clearance between its upper surface and said abutments for the lowermost cover of a series, and supporting strips for said series having cover engaging terminals.

13. In combination with a cover magazine tube having limiting abutments on its lower face, a slide plate having clearance between its upper surface and said abutments for the lowermost cover of a series, and supporting strips for said series having forwardly disposed concaved terminals for edge engagement with a cover.

14. In combination with a cover magazine tube having limiting abutments on its lower face, a slide plate having clearance between its upper surface and said abutments for the lowermost cover of a series, supporting strips on the slide plate for said series having cover engaging terminals, and a relatively movable selecting device carried by the plate.

15. In combination with a guiding frame, a hollow suction plunger mounted therein having an apertured bottom, a reciprocable suction head in the plunger, a slide plate adapted to select and move a lowermost cover from a superimposed series into registering relation with the plunger, an operating lever for the plunger and head respectively, actuating cams for said levers, and independently operating means for shifting the slide plate.

16. In combination with a guiding frame, a hollow suction plunger mounted therein having an apertured bottom, a reciprocable suction head in the plunger, a slide plate adapted to select and move a lowermost cover from a superimposed series into registering relation with the plunger, a cam actuated operating lever for the plunger and head respectively, an operating lever for the slide plate having a movement arresting device, and an actuating cam for said lever.

17. A shifting device for thin disk-shaped caps consisting of a horizontally movable plate provided with a central open slot, supporting strips on the slide plate at each side of said slot having pushing terminals, and a preliminary push finger carried by the plate in the central slot.

18. A shifting device for thin disk-shaped caps consisting of a horizontally movable plate provided with a central open slot, supporting strips on the slide plate at each side of said slot having pushing terminals, and a preliminary push finger in the central slot loosely connected with the plate or falling and rising movement therein.

19. A shifting device for thin disk-shaped caps consisting of a horizontally movable plate provided with a central slot, supporting strips on the slide plate at each side of said slot having pushing terminals, a preliminary push finger in the central slot loosely connected with the plate for falling and rising movement therein, and an inclined trackway for the push finger.

20. A shifting device for thin disk-shaped caps consisting of a horizontally movable plate provided with a central open slot, supporting strips at each side thereof having pushing terminals, an inclined trackway, a preliminary push finger consisting of a block loosely connected with the plate and mounted in the inclined trackway, and having a thin edge-engaging plate and a sloping extension in advance thereof.

21. Means for preliminarily selecting and advancing the lowermost disk of a series carried within a superimposed reservoir having underneath retaining abutments, consisting of a horizontally movable plate movable below the reservoir having a loosely connected lowering selecting finger provided with a forwardly extending inclined wedging portion and a thin concaved engaging edge.

In testimony whereof we hereunto affix our signatures.

CHRISTIAN N. BERGMANN.
ELMER Z. TAYLOR.
CYRUS TAYLOR.